United States Patent
Song (10) Patent No.: US 10,906,408 B2
(45) Date of Patent: Feb. 2, 2021

(54) METHOD FOR CONTROLLING CHARGING VOLTAGE OF 12V AUXILIARY BATTERY FOR HYBRID VEHICLE

(71) Applicants: Hyundai Motor Company, Seoul (KR); Kia Motors Corporation, Seoul (KR)

(72) Inventor: Hong-seok Song, Gyeonggi-Do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/686,717

(22) Filed: Nov. 18, 2019

(65) Prior Publication Data
US 2020/0079231 A1 Mar. 12, 2020

Related U.S. Application Data (62) Division of application No. 14/558,499, filed on Dec. 2, 2014, now Pat. No. 10,611,256, which is a division
(Continued)

(30) Foreign Application Priority Data

Dec. 4, 2009 (KR) .................. 10-2009-0119494
Jul. 28, 2010 (KR) .................. 10-2010-0072886

(51) Int. Cl.
*B60L 50/61* (2019.01)
*B60L 1/14* (2006.01)
(Continued)

(52) U.S. Cl.
CPC .............. *B60L 50/61* (2019.02); *B60L 1/003* (2013.01); *B60L 1/02* (2013.01); *B60L 1/14* (2013.01);
(Continued)

(58) Field of Classification Search
CPC ............... B60L 11/185; B60L 2240/80; B60L 2240/545; B60L 1/02; B60L 1/003;
(Continued)

(56) References Cited

U.S. PATENT DOCUMENTS 6,630,810 B2 10/2003 Takemasa et al.
8,203,857 B2 6/2012 Ohshima et al.
(Continued)

FOREIGN PATENT DOCUMENTS

CN 1703816 A 11/2005
CN 101420137 A 4/2009
(Continued)

*Primary Examiner* — Richard Isla
*Assistant Examiner* — Johali A Torres Ruiz
(74) *Attorney, Agent, or Firm* — Mintz Levin Cohn Ferris Glovsky and Popeo, P.C.; Peter F. Corless (57) ABSTRACT

The present invention provides a method for controlling a charging voltage of a 12V auxiliary battery for a hybrid vehicle, which can (1) improve charging efficiency of an auxiliary battery by increasing the output voltage of a DC-DC converter during cold start when the outside air temperature is low, (2) improve the charging efficiency of the auxiliary battery by increasing or decreasing the output power of the DC-DC converter according to the state of charge of the auxiliary battery and by increasing the output voltage of the DC-DC converter when many electrical loads are turned on, and (3) allow the DC-DC converter to provide continuous power supply for charging the auxiliary battery by turning on a main switch disposed between a high voltage battery and the DC-DC converter based on a reverse power conversion operation of the DC-DC converter even in the case where the voltage of the auxiliary battery falls below 9V.

2 Claims, 5 Drawing Sheets

Related U.S. Application Data of application No. 12/941,465, filed on Nov. 8, 2010, now Pat. No. 8,928,272.

(51) Int. Cl.

| | | |
|---|---|---|
| *H01M 10/44* | (2006.01) | |
| *B60L 15/00* | (2006.01) | |
| *B60L 1/02* | (2006.01) | |
| *B60L 1/00* | (2006.01) | |
| *B60L 50/40* | (2019.01) | |
| *B60L 53/10* | (2019.01) | |
| *B60L 50/16* | (2019.01) | |
| *B60L 58/20* | (2019.01) | |
| *H02J 7/34* | (2006.01) | |

(52) U.S. Cl.
CPC ............ *B60L 15/007* (2013.01); *B60L 50/16* (2019.02); *B60L 50/40* (2019.02); *B60L 53/11* (2019.02); *B60L 58/20* (2019.02); *H01M 10/44* (2013.01); *H01M 10/443* (2013.01); *H02J 7/342* (2020.01); *B60L 2210/10* (2013.01); *B60L 2210/40* (2013.01); *B60L 2240/545* (2013.01); *B60L 2240/547* (2013.01); *B60L 2240/549* (2013.01); *B60L 2240/662* (2013.01); *B60L 2240/80* (2013.01); *H02J 7/345* (2013.01); *Y02T 10/62* (2013.01); *Y02T 10/64* (2013.01); *Y02T 10/70* (2013.01); *Y02T 10/7072* (2013.01); *Y02T 10/72* (2013.01); *Y02T 90/16* (2013.01)

(58) Field of Classification Search
CPC .. B60L 1/14; B60L 50/16; B60L 50/40; B60L 50/61; H02J 7/342; H01M 10/44; H01M 10/443; Y02T 10/62; Y02T 10/64; Y02T 10/70; Y02T 10/72; Y02T 10/7072

See application file for complete search history.

(56) References Cited

U.S. PATENT DOCUMENTS

| | | | |
|---|---|---|---|
| 2001/0004205 A1 | 6/2001 | Miller | |
| 2002/0101217 A1 | 8/2002 | Hosoda et al. | |
| 2004/0041952 A1* | 3/2004 | Onomatsu | H04N 5/4401 |
| | | | 348/733 |
| 2005/0048335 A1 | 3/2005 | Fields et al. | |
| 2005/0099155 A1 | 5/2005 | Okuda et al. | |
| 2005/0151505 A1 | 7/2005 | Dias et al. | |
| 2007/0264541 A1 | 11/2007 | Yanase et al. | |
| 2009/0108674 A1* | 4/2009 | Ozaki | B60L 50/16 |
| | | | 307/10.6 |
| 2009/0112384 A1 | 4/2009 | Jeon et al. | |
| 2009/0237087 A1 | 9/2009 | Anbari | |
| 2009/0243390 A1 | 10/2009 | Oto | |
| 2010/0173211 A1 | 7/2010 | Kim et al. | |
| 2012/0123625 A1* | 5/2012 | Ueo | B60L 58/12 |
| | | | 701/22 |

FOREIGN PATENT DOCUMENTS

| | | |
|---|---|---|
| JP | 07-107619 | 4/1995 |
| JP | 11-275714 | 10/1999 |
| JP | 2002-233062 A | 8/2002 |
| JP | 2003-299210 A | 10/2003 |
| JP | 2007-189760 A | 7/2007 |
| JP | 2009-191722 A | 8/2009 |
| KR | 10-2005-0024904 A | 3/2005 |
| KR | 10-2005-0047221 A | 5/2005 |
| KR | 10-2005-0073703 A | 7/2005 |
| KR | 10-0867795 | 11/2008 |
| KR | 10-0916428 | 6/2009 |

* cited by examiner

METHOD FOR CONTROLLING CHARGING VOLTAGE OF 12V AUXILIARY BATTERY FOR HYBRID VEHICLE

CROSS-REFERENCE TO RELATED APPLICATION

This application is a Divisional Application to U.S. Ser. No. 14/558,499, filed Dec. 2, 2014 which is a Divisional Application to U.S. Ser. No. 12/941,465, filed Nov. 8, 2010, which claims under 35 U.S.C. § 119(a) the benefit of Korean Patent Applications Nos. 10-2009-0119494 filed Dec. 4, 2009 and 10-2010-0072886 filed Jul. 28, 2010, the entire contents of which are incorporated herein by references.

BACKGROUND

(a) Technical Field

The present disclosure relates generally to a method for controlling a charging voltage of an auxiliary battery, particularly a 12V auxiliary battery for a hybrid vehicle. More particularly, it relates to a method wherein the power conversion of a DC-DC converter is controlled based on factors such as the outside air temperature, the state of charge of the auxiliary battery, and the power consumption of electrical loads.

(b) Background Art

Hybrid vehicles are the vehicles of the future that employ an electric motor as an auxiliary power source as well as a gasoline engine to provide a reduction in exhaust gas and an improvement in fuel efficiency.

When the engine operates in an inefficient state, the electric motor is driven by the power of a battery to increase the efficiency of a hybrid system (load leveling). During deceleration, the battery is charged by regenerative braking, in which the kinetic energy, which would normally be dissipated as frictional heat in a brake system, is converted into electrical energy by the power generation of the motor. As such, the fuel efficiency is improved.

Hybrid vehicles are divided into soft type hybrid vehicles and hard type hybrid vehicles based on whether or not the motor is connected and driven in a power transmission system.

Figure 5:
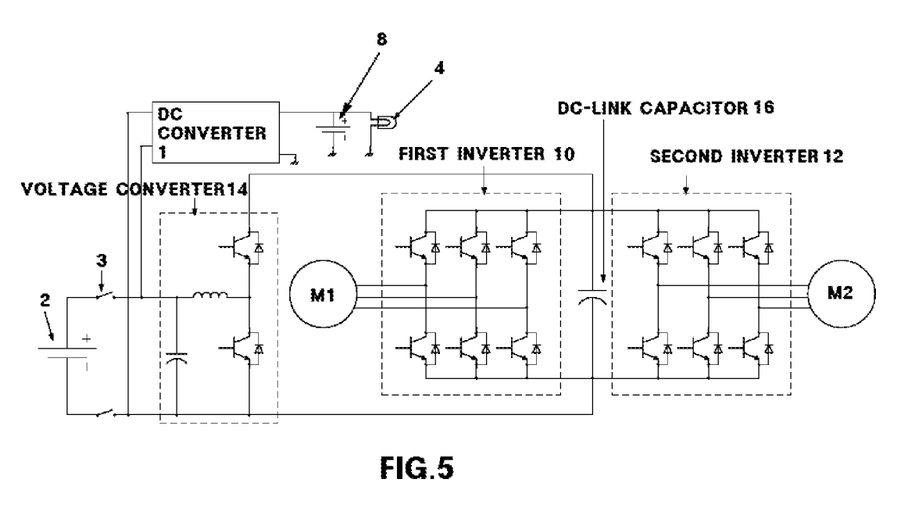
FIG. 5 is a schematic diagram of a motor drive system for a hybrid vehicle.

A motor drive system for an existing hard type hybrid vehicle is shown in FIG. 5. As shown in FIG. 5, the motor drive system includes first and second motors M1 and M2 for driving the vehicle; first and second inverters 10 and 12 for driving the first and second motors M1 and M2, respectively; a DC high voltage battery 2 for applying a DC voltage for driving the motors M1 and M2 to the first and second inverters 10 and 12; a voltage converter 14 for boosting the DC voltage from the battery 2 and supplying the boosted voltage to the first and second inverters 10 and 12, and for lowering the DC voltage from the first and second inverters 10 and 12 and supplying the lowered voltage to the battery 2; and a DC-DC converter 1 connected to the battery 2 for converting the voltage of the DC power source.

Figure 1:
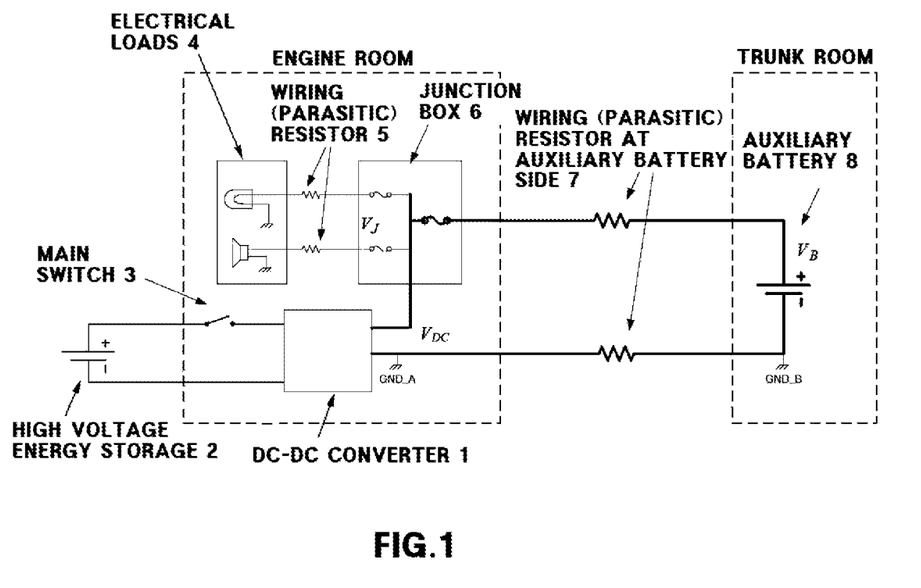
FIG. 1 is a schematic diagram of a system for charging a 12V auxiliary battery for a hybrid vehicle and supplying power to electrical loads.

FIG. 1 shows a system for charging a 12V auxiliary battery for a hybrid vehicle and supplying power to electrical loads. As shown, a high voltage battery 2 is connected to a DC-DC converter 1 through a main switch 3. An output terminal of the DC-DC converter 1 is connected to a 12V auxiliary battery 8 and 12V electrical loads 4 (such as a variety of controllers, headlights, a water pump, a radiator cooling fan, etc.), which are driven by the power of the 12V auxiliary battery 8. As further shown, a junction box 6 is connected between the DC-DC converter 1 and the electrical loads 4 and between the 12V auxiliary battery 8 and the electrical loads 4. A wiring (parasitic) resistor 7 at the auxiliary battery side is disposed between the DC-DC converter 1 and the 12V auxiliary battery 8, and between the 12V auxiliary battery 8 and the junction box 6. A wiring (parasitic) resistor 5 is also disposed between the electrical loads 4 and the junction box 6.

In FIG. 1, $V_{DC}$ represents the output voltage of the DC-DC converter 1, $V_j$ represents the voltage of the junction box 6 applied to the electrical loads 4 when the current of the electrical loads 4 is low, and $V_B$ represents the charging voltage of the 12V auxiliary battery 8. The magnitude of the voltage is in the order of $V_{DC} > V_j \gg V_B$.

The start-up sequence of a hybrid vehicle typically includes a step in which the ignition switch (IG) is turned on by a driver, a step in which the various controllers and the main switch 3 are turned on by power from the 12V auxiliary battery 8 (the DC-DC converter 1 is not operated until the main switch 3 is turned on), and a step in which the DC-DC converter 1 operates upon completion of the start-up to charge the auxiliary battery 8 and to supply electrical power to the electrical loads 4.

In a hybrid vehicle (such as a fuel cell vehicle, a plug-in hybrid vehicle, and an electric vehicle) having the above configuration and operation, if the voltage of the DC-DC converter is maintained at a low level, the power consumption of the electrical loads is reduced, which improves the fuel efficiency. However, the amount of electrical energy charged in the auxiliary battery is reduced, which reduces the charging efficiency, thereby causing a failure during cold start-up. In particular, the DC-DC converter in the hybrid vehicle performs the functions of charging the 12V auxiliary battery and supplying power to the electrical loads of the vehicle. To improve the fuel efficiency, it is necessary to maintain the voltage supplied to the electrical loads at a lower level. It is also advantageous to increase the charging voltage within an allowable range to improve the charging efficiency of the auxiliary battery. However, if the auxiliary battery charge is low, the vehicle may not start during cold start-up due to the reduction in battery voltage, which may reduce the quality of the vehicle. In particular, as shown in FIG. 1, if the distance between the DC-DC converter 1 and the electrical loads 4 is short, and if the distance between the DC-DC converter 1 and the auxiliary battery 8 is long, then the output voltage range of the DC-DC converter 1 is increased, which further reduces the power conversion efficiency.

While the diameter of the power cable between the DC-DC converter and the auxiliary battery may be increased in an attempt to address this problem, this results in an increased weight of the vehicle, increased manufacturing costs, and a reduction in the degree of freedom in cable layout. Alternatively, while the DC-DC converter and the auxiliary battery may be disposed adjacent to each other and, at the same time, the electrical loads may be spaced away from each other in an attempt to address this problem, this also reduces the degree of freedom in vehicle design and, further, reduces the quality of the vehicle due to various limitations such as cooling of the DC-DC converter and the like.

As mentioned above, the DC-DC converter 1 operates upon completion of the start-up to charge the auxiliary battery 8 and to supply electrical power to the electrical loads 4. At this time, if the voltage of the auxiliary battery is less than 9V, the main switch 3 generally may not be turned on (however, it is noted that various controllers normally operate at a voltage of more than 6V), and thus the DC-DC converter is not connected to the high voltage battery 2. As a result, the auxiliary battery is not charged, and the voltage of the auxiliary battery may be further reduced during the cold start-up.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a method for controlling a charging voltage of an auxiliary battery for a hybrid vehicle. In particular, the present invention improves the charging efficiency of an auxiliary battery by increasing the output voltage of a DC-DC converter, particularly during cold start when the outside air temperature is low. It is noted that while the present methods are described with particular reference to 12V auxiliary batteries, the methods could be suitably modified and applied to different voltage batteries.

In accordance with one aspect of the present invention the output power of a DC-DC converter is increased or decreased according to the state of charge of the auxiliary battery, and the output voltage of the DC-DC converter is increased when many electrical loads are turned on. As such, charging efficiency of the auxiliary battery is improved.

In another aspect of the present invention, the DC-DC converter is configured to provide a continuous power supply for charging the auxiliary battery. In particular, a main switch is disposed between a high voltage battery and the DC-DC converter, and the switch is turned on based on a reverse power conversion operation of the DC-DC converter even when the voltage of the auxiliary battery falls below a lower limit, such as 9V for the case of a 12V auxiliary battery.

In an exemplary embodiment, the present invention provides a method for controlling a charging voltage of a 12V auxiliary battery for a hybrid vehicle, the method including: comparing the outside air temperature with a boundary temperature after the vehicle is started; if the outside air temperature is lower than the boundary temperature, measuring the voltage of the 12V auxiliary battery; and increasing the output voltage at a DC-DC converter if the voltage of the 12V auxiliary battery is beyond a predetermined reference voltage range.

In another aspect, the present invention provides a method for controlling a charging voltage of a 12V auxiliary battery for a hybrid vehicle, the method including: comparing the current amount of 12V electrical loads with a reference load value after the vehicle is started; if the amount of 12V electrical loads is smaller than the reference load value, increasing the output voltage of the DC-DC converter to improve charging efficiency of a 12V auxiliary battery; if the amount of 12V electrical loads is greater than the reference load value, determining the state of charge of the 12V auxiliary battery; and if the state of charge of the 12V auxiliary battery is lower than a charge boundary value, enhancing the charging speed of the 12V auxiliary battery.

In still another aspect, the present invention provides a method for controlling a charging voltage of a 12V auxiliary battery for a hybrid vehicle, the method including: comparing the voltage of the 12V auxiliary battery with a low limit value for operation of a main switch (which connects a high voltage battery to a DC-DC converter) and a variety of controllers after the vehicle is started; if the voltage of the 12V auxiliary battery falls below the low limit value, allowing the DC-DC converter to perform a reverse power conversion; allowing electrical energy to be transferred from the 12V auxiliary battery to a high voltage capacitor for storage; allowing the DC-DC converter to perform a forward power conversion for a predetermined short period of time; and allowing high voltage energy of the high voltage capacitor to be supplied to the 12V auxiliary battery through the DC-DC converter.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Reference numerals set forth in the Drawings includes reference to the following elements as further discussed below:

| | |
|---|---|
| 1: DC-DC converter | 2: high voltage battery |
| 3: main switch | 4. electrical loads |
| 6: junction box | 5 & 7: parasitic resistors |
| 8: 12 V auxiliary battery | 10 & 12: inverters |
| 14: voltage converter | 16: DC-link capacitor |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

As mentioned above with reference to FIG. 1, in a system for charging a 12V auxiliary battery and supplying power to the electrical loads 4, the high voltage battery 2 is connected to the DC-DC converter 1 through the main switch 3, and the output terminal of the DC-DC converter 1 is connected to the 12V auxiliary battery 8 and the 12V electrical loads 4. Also, as shown in FIG. 5, in the motor drive system for the hybrid vehicle, the first and second inverters 10 and 12 for driving the motors M1 and M2 are connected to an input terminal of the DC-DC converter 1 through the voltage converter 14 and a DC-link capacitor 16.

The present invention provides methods for controlling a charging voltage of a 12V auxiliary battery for a hybrid vehicle by controlling the power conversion of the DC-DC converter based on the outside air temperature, the state of charge of the auxiliary battery, and the power consumption of electrical loads.

Figure 2:
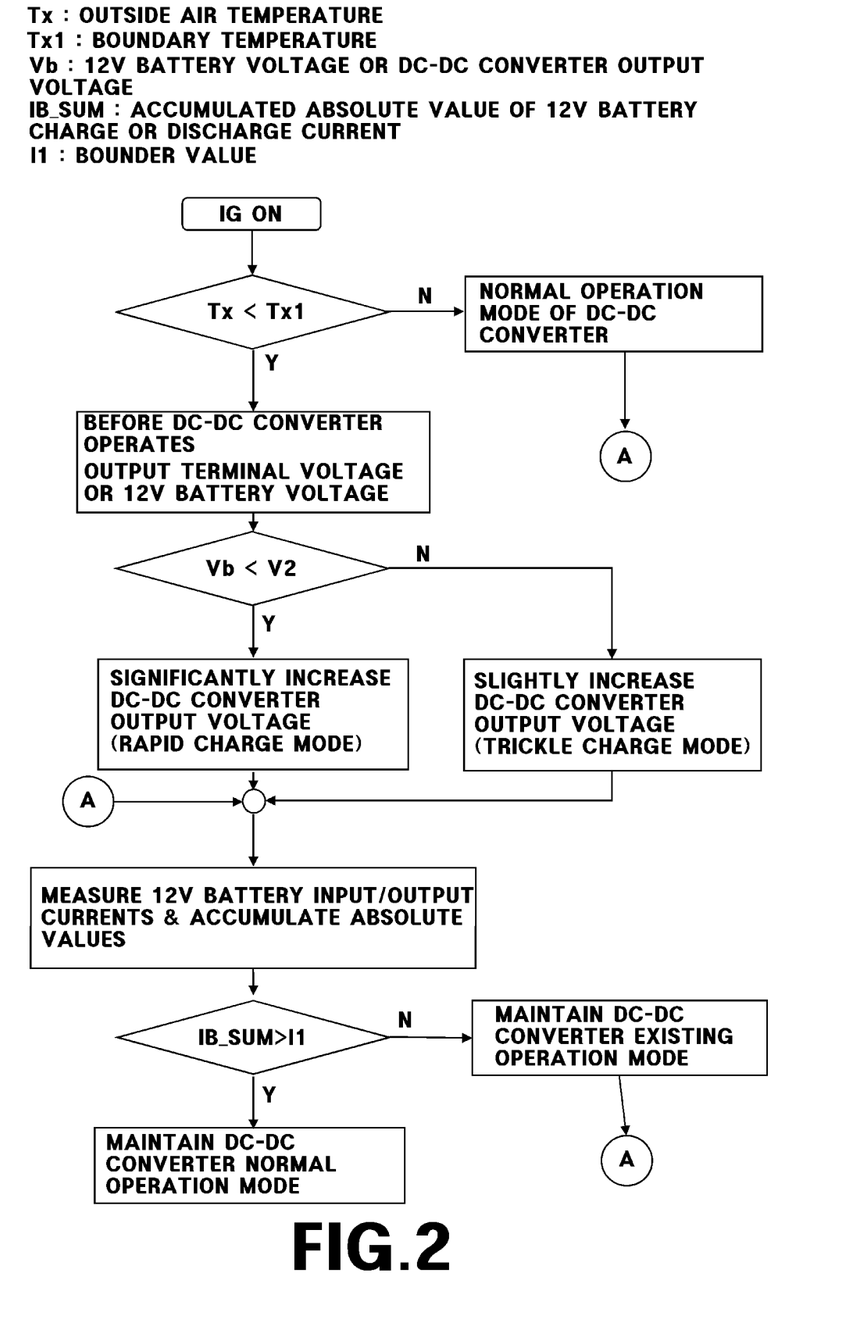
FIG. 2 is a flowchart illustrating a method for controlling a charging voltage of a 12V auxiliary battery for a hybrid vehicle in accordance with an exemplary embodiment of the present invention.

An exemplary embodiment of the present invention will be described with reference to FIG. 2 which shows a method for controlling the charging voltage of the 12V auxiliary battery for the hybrid vehicle. This method prevents the reduction of the auxiliary battery voltage at low temperatures, and, thus, the reduction in charging efficiency during cold start. If the ambient temperature of the vehicle is low (for example, below 0° C.) during operation of the DC-DC converter, the present method increases the output voltage of the DC-DC converter and, at the same time, increase the voltage supplied from the DC-DC converter to the auxiliary battery, regardless of the reduction in fuel efficiency. As a result, the charging speed of the auxiliary battery is enhanced.

In a preferred embodiment, after the vehicle is started, it is determined whether the outside air temperature Tx is lower than a boundary temperature Tx1. If the outside air temperature is higher than the boundary temperature, the DC-DC converter is controlled to operate in a normal mode.

On the other hand, if it is determined that the outside air temperature is lower than the boundary temperature (for example, below 0° C.), the voltage at the output terminal of the DC-DC converter or the voltage Vb of the 12V auxiliary battery is measured. If the voltage at the output terminal of the DC-DC converter or the voltage Vb of the 12V auxiliary battery is lower than a predetermined reference voltage V2, the DC-DC converter is controlled to operate in a rapid charge mode to significantly increase its output voltage. If the voltage at the output terminal of the DC-DC converter or the voltage Vb of the 12V auxiliary battery is higher than the predetermined reference voltage V2, the DC-DC converter is controlled to operate in a trickle charge mode to slightly increase its output voltage.

As such, if the outside air temperature falls below the boundary temperature, the present method increases the output voltage of the DC-DC converter to facilitate the charging of the 12V auxiliary battery. Thus, in the case where the state of charge of the 12V auxiliary battery is low, it is possible to prevent a situation in which the vehicle does not start during cold start-up due to the reduction in the voltage of the auxiliary battery.

Subsequently, the current charged into or discharged from the 12V auxiliary battery is measured. If the accumulated absolute value IB_SUM of the charge or discharge current is higher than a boundary value 11, the DC-DC converter is controlled to operate in a normal mode. If it is lower than the boundary value 11, the DC-DC converter is controlled to operate in a mode in which its output voltage is significantly or slightly increased.

Figure 3:
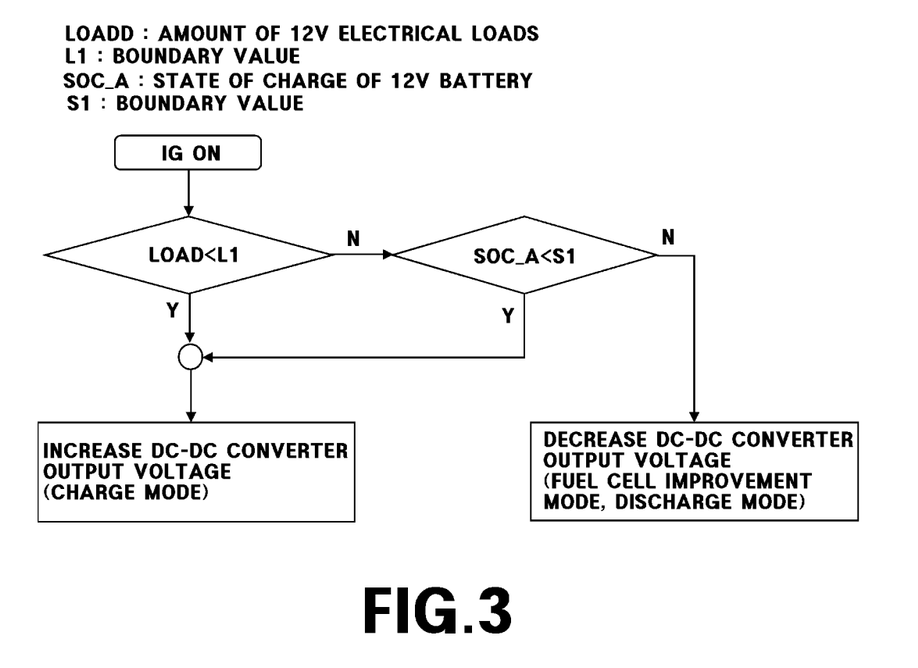
FIG. 3 is a flowchart illustrating a method for controlling a charging voltage of a 12V auxiliary battery for a hybrid vehicle in accordance with another exemplary embodiment of the present invention.

Another exemplary embodiment of the present invention will be described with reference to FIG. 3 which shows a method for controlling the charging voltage of the 12V auxiliary battery for a hybrid vehicle. In this embodiment, the charging efficiency of the auxiliary battery is improved by increasing or decreasing the output voltage of the DC-DC converter according to the state of charge of the auxiliary battery, because the voltage of the auxiliary battery is determined according to the state of charge of the auxiliary battery. In particular, if the state of charge of the auxiliary battery is high, then the output voltage of the DC-DC converter is decreased to improve the fuel efficiency. On the other hand, if the state of charge of the auxiliary battery is low, the output voltage of the DC-DC converter is increased regardless of the reduction in fuel efficiency, thereby enhancing the charging speed of the auxiliary battery.

In accordance with this embodiment, when the amount of electrical loads being operated is low, the DC-DC converter is controlled to operate in a mode for enhancing the charging speed of the auxiliary battery In this case, an increase in the power consumption of the electrical loads is small even though the output voltage of the DC-DC converter is increased. On the other hand, when the amount of electrical loads being operated is high, the DC-DC converter is controlled to operate in a mode for improving the fuel efficiency in which the output voltage of the DC-DC converter is decreased.

In a preferred embodiment, after the vehicle is started, the amount of 12V electrical loads being operated is determined, and the amount of 12V electrical loads being operated is compared with a reference load value L1.

If the amount of 12V electrical loads being operated is lower than the reference load value L1, the output voltage of the DC-DC converter is increased to facilitate the charging of the 12V auxiliary battery. In other words, a mode for enhancing the charging speed of the auxiliary battery is performed. In this case, where the amount of 12V electrical loads being operated is lower than the reference load value L1, the increase in the amount of electrical loads is relatively small, even though the output voltage of the DC-DC converter is increased, and the amount of electrical loads is proportional to the voltage. Therefore, the charge of the 12V auxiliary battery is advantageously made.

On the other hand, if the amount of 12V electrical loads being operated is higher than the reference load value L1, the state of charge of the 12V auxiliary battery SOC_A is determined. If the state of charge of the 12V auxiliary battery SOC_A is lower than a charge boundary value S1, the method proceeds to a mode for enhancing the charging speed of the auxiliary battery. On the other hand, if the state of charge of the 12V auxiliary battery SOC_A is higher than the charge boundary value S1, the method proceeds to a mode for improving the fuel efficiency, in which the output voltage of the DC-DC converter is decreased. In particular, if the amount of 12V electrical loads is higher than the reference load value L1, it means that a large number of electrical loads are operated.) Thus, it is possible to reduce the power consumption of the electrical loads by decreasing the output voltage of the DC-DC converter.

Figure 4:
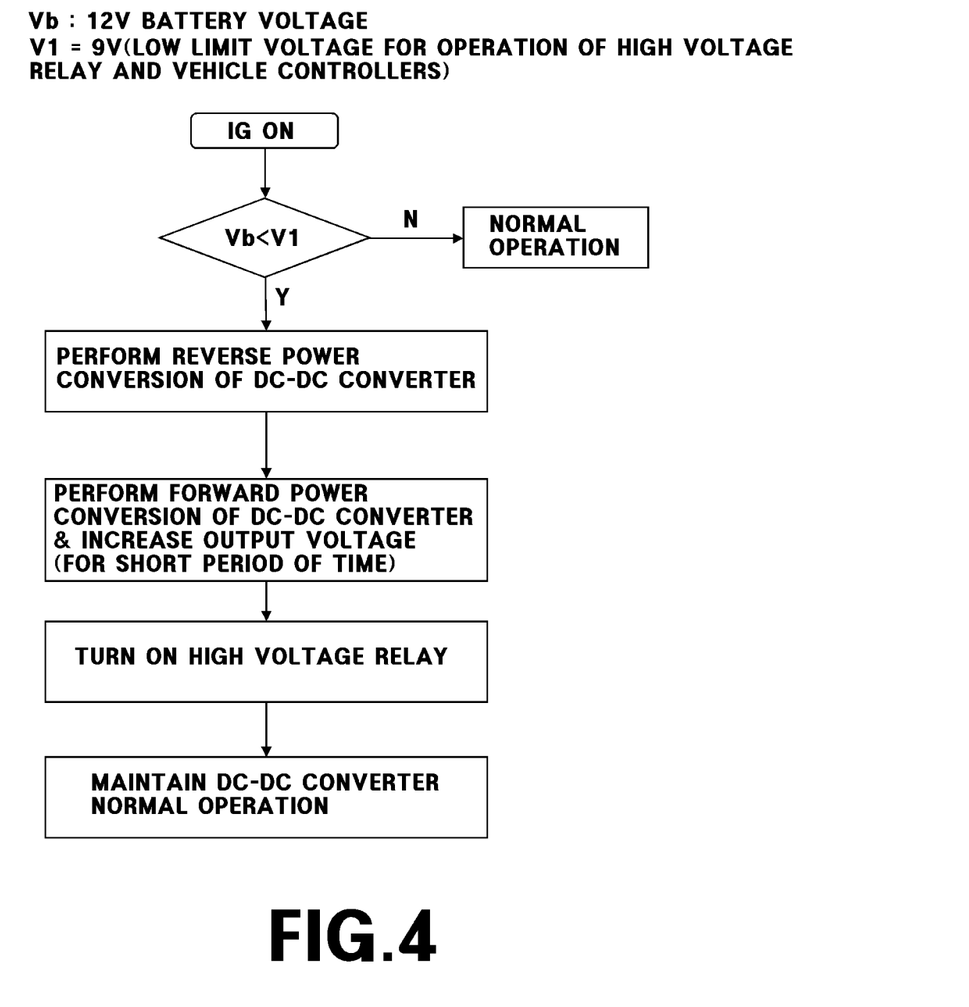
FIG. 4 is a flowchart illustrating a method for controlling a charging voltage of a 12V auxiliary battery for a hybrid vehicle in accordance with still another exemplary embodiment of the present invention.

Another exemplary embodiment of the present invention will be described with reference to FIG. 4 which shows a method for controlling the charging voltage of the 12V auxiliary battery for a hybrid vehicle. In this embodiment, as shown and described in connection with FIG. 1, if the voltage of the 12V auxiliary battery falls below 9V, the main switch 3 is not turned on, and thus the DC-DC converter 1 does not use the power of the high voltage battery 2. Therefore, in this embodiment, the auxiliary battery is charged by applying a momentary high voltage to the auxiliary battery such that the auxiliary battery can apply a voltage of more than 9V to the main switch. In particular, the DC-DC converter performs a reverse power conversion from the auxiliary battery to the high voltage capacitor (i.e., the DC-link capacitor connected between the voltage converter, which is connected to the high voltage battery, and the inverter) such that the electrical energy of the auxiliary battery is charged into the high voltage capacitor. After sufficient additional electrical energy is stored in the high voltage capacitor, the DC-DC converter performs a forward power conversion from the high voltage capacitor to the auxiliary battery for a short period of time such that a high voltage (e.g., about 14V) is supplied from the high voltage capacitor to the auxiliary battery. As a result, the auxiliary battery applies a voltage of more than 9V to the main switch.

In an exemplary embodiment, after the vehicle is started, the voltage Vb of the 12V auxiliary battery is compared with a low limit value V1 for the operation of the main switch (i.e., relay), which connects the high voltage battery to the DC-DC converter, and a variety of controllers. If the voltage Vb of the 12V auxiliary battery falls below the low limit value V1 (for example, if the voltage of the 12V auxiliary battery falls below 9V), the reverse power conversion operation of the DC-DC converter is performed. Based on the reverse power conversion operation of the DC-DC converter, the electrical energy is transferred from the 12V auxiliary battery to the high voltage capacitor (for example, the DC-link capacitor or the capacitor at the input terminal of the DC-DC converter). Thus, much more electrical energy is further stored in the high voltage capacitor. Subsequently, the DC-DC converter performs a forward power conversion for a predetermined short period of time such that a high voltage (e.g., about 14V) of the high voltage capacitor is supplied to the 12V auxiliary battery through the DC-DC converter and charged thereinto.

As such, according to the principle that when the electrical energy is charged in the auxiliary battery in the reverse direction for a relatively long period of time and is then transferred in the forward direction for a short period of time, the voltage is increased. A momentary normal charge of the 12V auxiliary battery is performed and, as a result, the 12V auxiliary battery applies a voltage of more than 9V to the various controllers and the main switch, thereby turning on the main switch. Once the mail switch is turned on, the DC-DC converter is normally driven by the power of the high voltage battery, thus supplying a stable voltage for charging the 12V auxiliary battery.

The present invention, thus, provides methods for improving the charging efficiency of an auxiliary battery and improving the cold start performance even when outside air temperature is low by increasing the output voltage of the DC-DC converter. Further, if the state of charge of the auxiliary battery is high, the fuel efficiency is improved by decreasing the output voltage of the DC-DC converter. On the other hand, if the state of charge of the auxiliary battery is low, the charging efficiency of the auxiliary battery is improved by increasing the output voltage of the DC-DC converter. Further, if the amount of electrical loads being operated is small, the charging efficiency of the auxiliary battery is improved by increasing the output power of the DC-DC converter. On the other hand, if the amount of electrical loads being operated is large, the fuel efficiency is improved by decreasing the output voltage of the DC-DC converter. Still further, even in the case where the voltage of the auxiliary battery falls below 9V, according to the present invention, the main switch disposed between the high voltage battery and the DC-DC converter is turned on based on the reverse power conversion operation of the DC-DC converter such that the DC-DC converter operates normally to thereby continuously charge the auxiliary battery.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for controlling a charging voltage of a 12V auxiliary battery for a hybrid vehicle, the method comprising:
    comparing the voltage of a 12V auxiliary battery with a low limit value for operation of a main switch, wherein the main switch connects a high voltage battery to a DC-DC converter, and a variety of controllers after the vehicle is started;
    if the voltage of the 12V auxiliary battery falls below the low limit value, allowing the DC-DC converter to perform a reverse power conversion;
    allowing electrical energy to be transferred from the 12V auxiliary battery to a high voltage capacitor and stored in the high voltage capacitor;
    allowing the DC-DC converter to perform a forward power conversion for a predetermined short period of time; and
    allowing high voltage energy of the high voltage capacitor to be supplied to the 12V auxiliary battery through the DC-DC converter.

2. The method of claim 1, further comprising:
    allowing a voltage of more than a low limit voltage to be applied from the 12V auxiliary battery to the main switch and the controllers to turn on the main switch; and
    allowing the DC-DC converter to be normally driven by the power of the high voltage battery due to the turning on of the main switch.

* * * * *